United States Patent [19]

Rush, III

[11] Patent Number: 5,539,935
[45] Date of Patent: Jul. 30, 1996

[54] SPORTS HELMET

[76] Inventor: Gus A. Rush, III, 1800 12th St., Meridian, Miss. 39301

[21] Appl. No.: 471,360

[22] Filed: Jun. 6, 1995

Related U.S. Application Data

[63] Continuation-in-part of Ser. No. 288,078, Aug. 10, 1994, which is a continuation-in-part of Ser. No. 66,670, May 25, 1993, Pat. No. 5,390,367, which is a continuation-in-part of Ser. No. 964,875, Oct. 22, 1992, Pat. No. 5,287,562, which is a continuation-in-part of Ser. No. 818,840, Jan. 10, 1992, abandoned.

[51] Int. Cl.$^6$ ........................................................ A42B 3/30
[52] U.S. Cl. ........................ 2/422; 2/413; 2/425; 2/906; 340/669; 455/100
[58] Field of Search ............................. 2/422, 413, 906, 2/905, 2, 425; 340/669; 455/100; 324/162, 178, 180; 128/782

[56] References Cited

U.S. PATENT DOCUMENTS

| 3,649,788 | 3/1972 | Heckendorf | 340/669 X |
| 3,859,650 | 1/1975 | Prachar | 340/669 x |
| 4,502,035 | 2/1985 | Obenauf et al. | 340/669 X |
| 5,329,637 | 7/1994 | Walker | 2/906 X |
| 5,402,535 | 4/1995 | Green | 2/413 X |

OTHER PUBLICATIONS

Lineback, "Football–Helmet Radio To Be Tested By NFL", Nov. 12, 1984, pp. 22 and 24.

Primary Examiner—Peter Nerbun
Attorney, Agent, or Firm—Cushman Darby & Cushman

[57] ABSTRACT

A signalling device is installed in headwear such as an athletic helmet and includes triaxially sensitive sensors for detecting impacts above a selected magnitude and for providing a signal characteristic of the magnitude and direction of an impact.

10 Claims, 2 Drawing Sheets 5,539,935

SPORTS HELMET

This application is a continuation-in-part of application Ser. No. 08/288,078, filed Aug. 10, 1994, which is a continuation-in-part of application Ser. No. 08/066,670, filed May 25, 1993, U.S. Pat. No. 5,390,367, which is a continuation-in-part of application Ser. No. 964,875, filed Oct. 22, 1992, U.S. Pat. No. 5,287,562, which is a continuation-in-part of application Ser. No. 07/818,840, filed Jan. 10, 1992, now abandoned.

FIELD OF THE INVENTION

The present invention relates to a helmet which contains a multi-axis set of sensors together with one or more signaling devices connected to the sensors. More particularly, the sensors are adapted to respond to accelerations corresponding to, for example, impacts experienced by the wearer of the helmet.

BACKGROUND OF THE INVENTION

As has long been known, in many athletic events, physical harm is often inflicted by the participants on each other and themselves as a result of collisions which are frequent in many sports such as football, soccer, field hockey and the like. Particularly in football, where the strategy of the game involves deliberate collisions between players, school authorities have become sensitive to the risks to which the participants have become exposed as well as the liability of the school system where injury results from such impacts. As a consequence, extensive supervised training has been necessary to separate out those students who engage in reckless behavior on the athletic field or who do not appreciate the danger to which they subject themselves and others by certain types of impacts experienced in these athletic endeavors. One particular problem that is troublesome to deal with is the student athlete who has experienced a head injury such as a concussion of undetermined severity. In the past, it has been impractical to quickly determine the severity of the concussion so as to enable a coach or supervisor or even a medical doctor to determine whether the student can continue in the activity which caused the injury. The same problem arises in the professional leagues where the stakes are much higher for a team, where such a team loses a valuable player due to the possibility of a severe head injury.

SUMMARY OF THE INVENTION

The present invention provides an indicating and signaling device which will give an indication of the magnitude of an impact suffered by an individual during an athletic event. In a specific embodiment, the present invention uses three axially oriented sensing devices each capable of providing an electrical output to a signaling device such as a lamp or LED, with the sensing devices being tri-axially oriented in a module which is incorporated into the helmet of the user. Further, the sensing devices will be adjustable so that each can be modulated to provide a signal upon the user's experiencing an impact above a selected magnitude. Such a signal may be in the form of an illumination and preferably includes an LED for each of the axially oriented sensing devices. With this arrangement, a coach or other adult monitor can detect when an impact of dangerous magnitude is experienced by a student or inflicted by a player since the impact will cause one of the sensing devices, depending on the direction in which it is inflicted, to actuate the signaling device which will be visible on a portion of the helmet. In a preferred arrangement, the illuminated sensing devices will remain illuminated for several hours to afford the monitor or coach sufficient time to inspect the helmets of each the users.

In the event that an athlete suffers a concussion, it will be possible to determine if the magnitude of an impact is dangerously high by adjusting the threshold of each of the mutually orthogonally disposed sensing devices taking into consideration the size and weight of the patient or athlete. Thus, when a sensing device is activated to illuminate a signaling LED or lamp in the helmet, the monitor or coach will be able to immediately determine that play should be stopped and that the injured athlete should be removed from the contest. This arrangement will have the benefit of allowing only slightly injured participants to continue to play in an athletic contest while minimizing the risk of serious injury.

BRIEF DESCRIPTION OF THE DRAWINGS

The foregoing and other objects will become apparent as consideration is given to the following detailed description taken in conjunction with the accompanying drawings, in which.

DETAILED DESCRIPTION OF THE INVENTION

Figure 1:
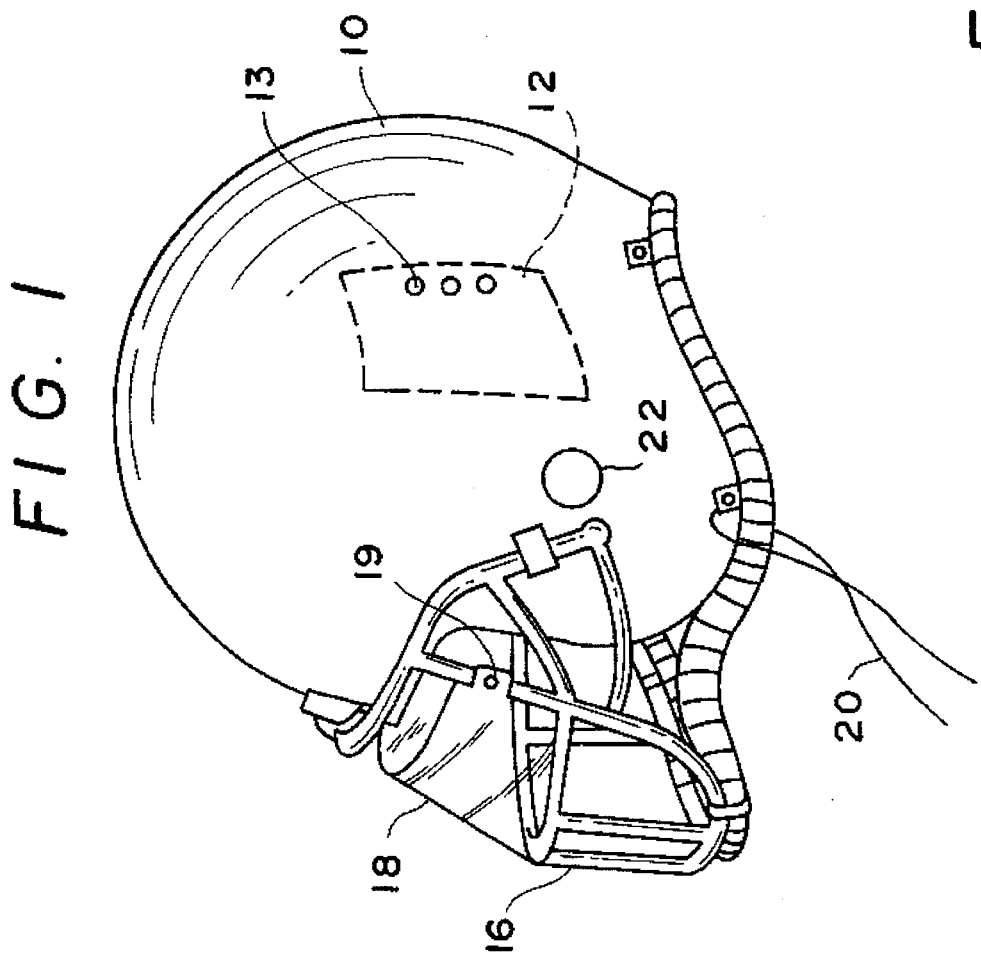
FIG. 1 is a perspective view of a helmet utilizing the signaling device of the present invention.

Referring now to the drawings wherein like numbers correspond throughout the several views, there is shown in FIG. 1, a helmet 10 in which a sensing and signaling module 12 is incorporated and which includes signaling lamps 13 in any suitable pattern which will be easily readable by one observing the helmet during use. The helmet 10 typically will be made from high impact polycarbonate and will be provided with the conventional face protector 16 and mask 18 secured by clips 19 as well as a chin strap 20 which will secure the secure the helmet 10 to the head of the user so that any movement of the head will result in a matching movement of the helmet. This is effected by suitable padding or foam lining for the helmet 10 as is conventional.

Preferably the signaling module 12 will be located just to the rear of either the left or right ear hole 22 of the helmet 10 as this location affords greater visibility to a monitor or coach and also exposes the module 12 to a lower probability of unnecessary impact during an athletic contest. Even in the event of such impacts, the module 12 can be made from a rugged polyethylene casing which need not be bulky to provide the desired axially oriented sensing function as described below. Indeed, with present day available accelerometer sensors, the thickness of the module 12 can be as low as a half inch while the circuit elements can be mounted on a board or formed into a single chip. The LED devices are known for their rugged construction and low space requirements and each can be actuated by a single lithium battery or other portable battery as described below.

Figure 2:
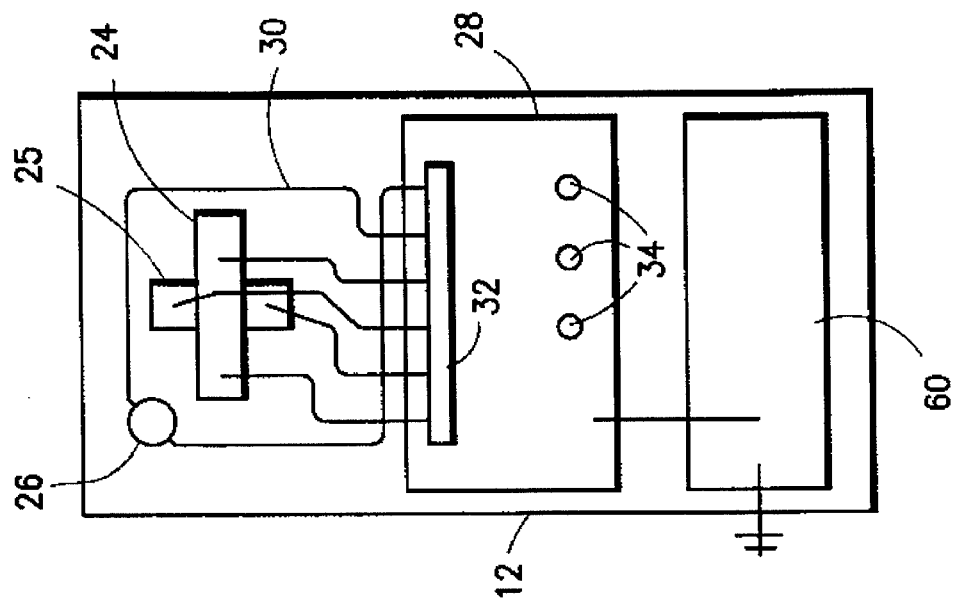
FIG. 2 is a schematic view of the circuit arrangement and sensors used with the helmet of FIG. 1.

Referring to FIG. 2, there is shown a schematic view of a module 12 which will include in one embodiment, a plurality of mutually orthogonally disposed cylinders 24, 25 and 26 each of which is substantially identically constructed and each of which is connected to a control device 28 by conductors, one of which is indicated at 30. Each of the cylinders 24–26 will have opposite ends connected by conductors 30 to an input board 32 for the control device 28.

Figure 3:
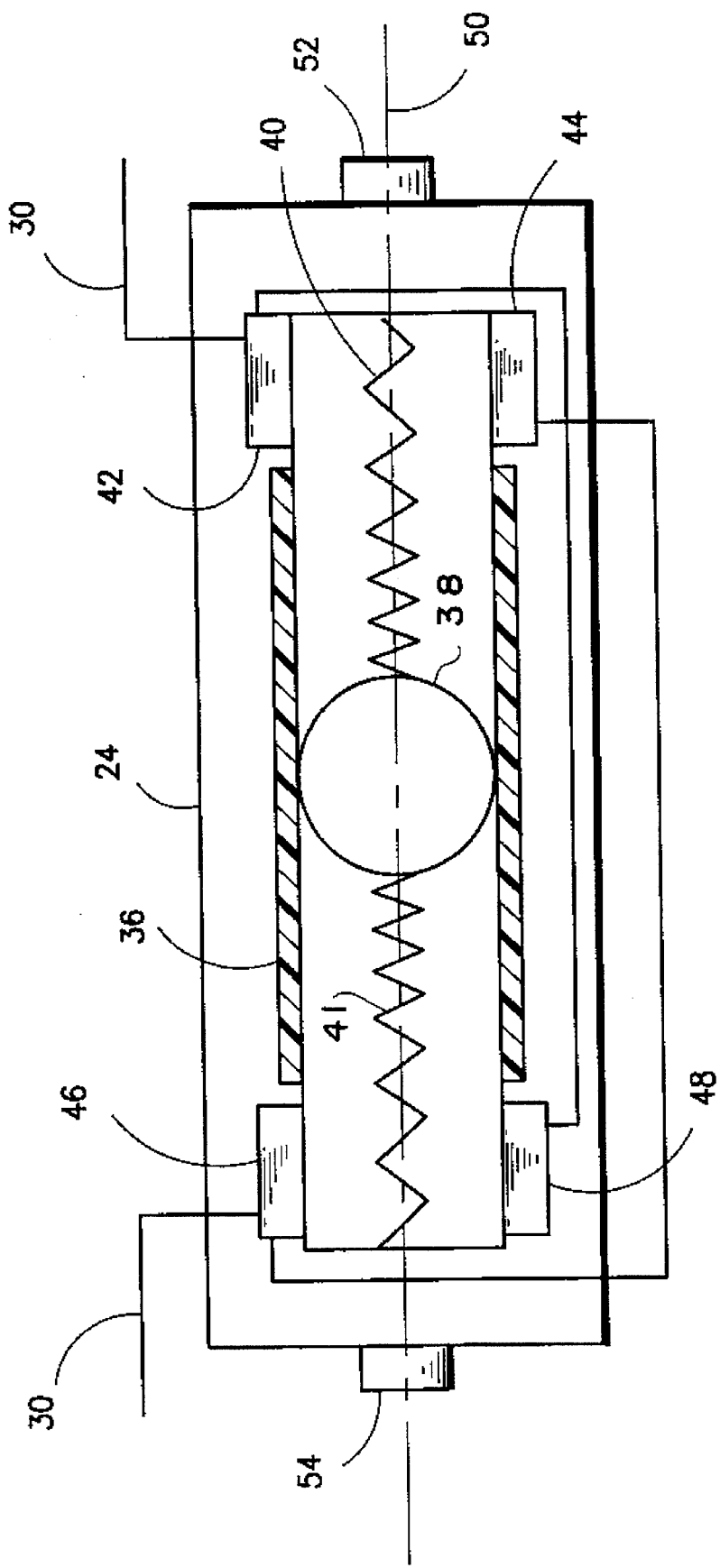
FIG. 3 is side sectional view in elevation of a sensor useful in the present invention.

With reference to FIG. 3, there is shown one embodiment of the accelerometer detector 24 useful in the present invention, it being understood that the accelerometer's cylinders 25 and 26 will be of identical construction. It will also be understood that other types of commercially available accelerometers may be employed. In the FIG. 3 embodiment, the accelerometer cylinder 24 includes an inner resilient lining 36 in tubular form and a conductive ball-bearing 38 which is maintained in a central position in the race defined by the interior surface of the resilient lining 36 by a pair of mutually oppositely acting springs 40. At the opposite ends of each race are a pair of contacts, 42 and 44, on the right as viewed in FIG. 3 and, 46 and 48, as viewed on the left. When the cylinder is acted upon by an impact causing rapid deceleration as is encountered in a sports event, provided the deceleration is parallel or generally parallel to the axis 50, the ball-bearing 38 will tend to move along a restrained path generally in the deceleration direction defined by the axis 50 until a pair of contacts are engaged. At this point, a circuit is made from a battery, not shown, through the opposite contacts, such as 42 and 44, to provide an output signal to the control device 28 in the form of an electrical pulse. The magnitude of the impact that will cause movement of the ball-bearing 38 can be controlled by adjusting the compression on the springs 41 and 42 by threaded end caps 52 and 54 the interior ends of which engage the respective spring's end and which can be adjusted as desired. For proper calibration, rotation of the respective end cap 52 or 54 will increase or decrease the compression of the respective spring. The drag on the movement of the ball-bearing 38 imposed by the elastic liner 36 will be relatively slight, but will provide stability for the ball-bearing so that slight jostling of a player's head will not cause actuation of the signaling device.

Referring back to FIG. 2, it is also within the scope of the present invention to provide a remote signaling device where a transmitter 60 is connected to the output of the control device 28 for transmitting to either the sidelines or another remote site the fact that one of the sensors 24, 25 or 26 has been actuated.

It will be apparent from the foregoing that various modifications may be made to the present invention and all are included within the scope of the appended claims.

What is claimed is:

1. Headwear comprising a covering for at least a portion of the head of a user, said covering including sensing means for detecting selected motion of the head of a user wearing said headwear, said sensing means including at least one signal generating member and an actuation member for actuating said signal generating member in response to acceleration of said actuating member above a selected magnitude of acceleration, said actuating member including a first directional and a second directional switch with said first and second directional switches being disposed each extending along a separate axis and with said axes extending at a selected angle to one another.

2. The invention as claimed in claim 1 wherein said headwear includes a transmitter for transmitting a said signal to a remote receiver.

3. The invention as claimed in claim 1 wherein said selected angle is approximately 90°.

4. The invention as claimed in claim 1 wherein said actuating member includes a third directional switch disposed along an axis that extends perpendicular to said separate axes.

5. The invention as claimed in claim 4 wherein said headwear includes a transmitter for transmitting a said signal to a remote receiver.

6. The invention as claimed in claims 1, 2, or 3 wherein said headwear is an athletic helmet.

7. The invention as claimed in claim 6 wherein said helmet has a storage portion provided with a chamber and said sensing member is enclosed in said chamber.

8. The invention as claimed in claim 1 wherein said directional switches are each provided with a housing having an electrical contact at one end thereof and a conductive member movably carried in said housing, said housing including a restraining device acting on said conductive member to restrain movement of said conductive member along the associated directional axis until the acceleration of a selected magnitude acts on said conductive member to overcome the force of said restraining device whereupon said conductive member will move to engage said electrical contact and close a circuit of said sensing means to actuate said signal generating member.

9. The invention as claimed in claim 8 wherein each said housing has an electrical contact at an end opposite said one end so that each said sensor will respond to acceleration in opposite directions.

10. The invention as claimed in claim 8 wherein each said housing includes resilient member to return said respective conductive member to a neutral position after sensing acceleration above a selected magnitude.

* * * * *